United States Patent [19]

Möller

[11] 4,230,407
[45] Oct. 28, 1980

[54] APPARATUS FOR MAKING POSITIVE PICTURES FROM SLIDES

[75] Inventor: Ursula Möller, Munich, Fed. Rep. of Germany

[73] Assignee: AGFA-Gevaert, A.G., Leverkusen, Fed. Rep. of Germany

[21] Appl. No.: 32,903

[22] Filed: Apr. 24, 1979

[30] Foreign Application Priority Data

Apr. 27, 1978 [DE] Fed. Rep. of Germany ....... 2818617

[51] Int. Cl.³ .................... G03B 27/32; G03B 27/52
[52] U.S. Cl. .............................. 355/27; 354/80, 86; 355/21; 355/39; 355/68
[58] Field of Search .................. 355/39, 77, 21, 27, 355/68; 354/80, 86

[56] References Cited

U.S. PATENT DOCUMENTS

| | | | |
|---|---|---|---|
| 3,295,425 | 1/1967 | Bing et al. | 355/21 X |
| 3,687,030 | 8/1972 | Dine et al. | 355/21 X |
| 3,689,148 | 9/1972 | Black | 355/39 X |
| 3,697,175 | 10/1972 | Sullivan | 355/39 |
| 3,709,119 | 1/1973 | Van Der Meer | 355/21 X |
| 3,836,927 | 9/1974 | Dine et al. | 354/80 |

Primary Examiner—Richard A. Wintercorn
Attorney, Agent, or Firm—Michael J. Striker

[57] ABSTRACT

The invention concerns a method of, and an apparatus for, making instant-picture positives from photographic slides.

1 Claim, 1 Drawing Figure

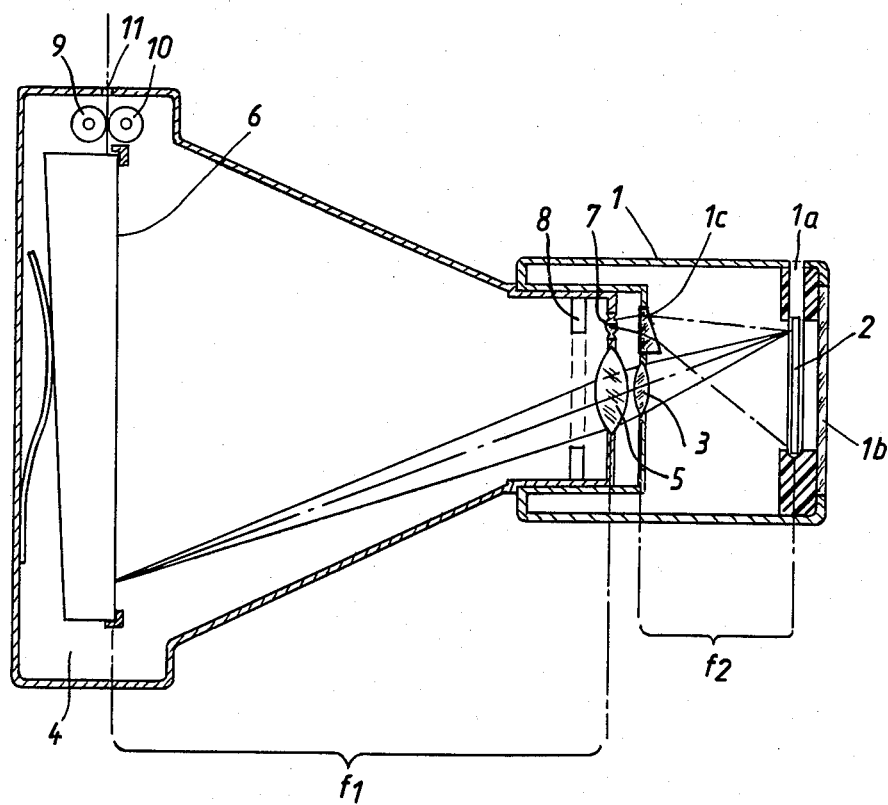

APPARATUS FOR MAKING POSITIVE PICTURES FROM SLIDES

BACKGROUND OF THE INVENTION

1. Field of the Invention

This invention relates to the field of photography.

More particularly, the invention relates to the copying of photographic slides.

Still more particularly, the invention is concerned with a method—and an apparatus for—making positive pictures from photographic slides.

2. The Prior Art

Making film positives (i.e. positive paper pictures) from diapositives (slides) is known. The oldest way of doing this involves making an intermediate negative which is then used to print positive paper copies. This is a relatively complicated process and is now being used only in such cases where especially high-quality paper copies are required.

Commonly used today is the reversal method, which produces positive pictures on an opaque carrier. This method is relatively simple and less expensive than the precisely discussed method, but yet produces good-quality pictures. Its only real drawback is that it requires rather elaborate equipment which is beyond the financial reach of most amateur photographers. Slides to be copied as positive paper pictures must therefore be sent to commercial processors. In many instances, however, the amateur photographer will object to the cost involved in doing this, and, even more importantly, to the time which is required before the paper pictures are received from the processor. There is, therefore, a definite and heretofore unfulfilled need for improvements in this field.

SUMMARY OF THE INVENTION

It is an object of the present invention to provide such improvements.

More particularly, it is an object of the invention to provide an improved method of making positive pictures from slides.

Another object is to provide such an improved method which is relatively inexpensive and does not require the usual waiting time for the pictures to be received from the commercial processor.

A concomitant object is to provide an apparatus for carrying out the method.

In keeping with these objects, and with still others which will become apparent hereafter, one aspect of the invention resides in a method of making positive pictures from slides, comprising the steps of spacing a photographic reproducing lens and a slide to be reproduced, apart from one another by a distance corresponding to the focal length of the lens; setting the picture-taking lens of a self-developing camera for infinity; placing the reproducing lens and slide on the camera so that the reproducing lens is immediately proximal to the picture-taking lens and the transmission path of light between the lenses is parallel; and reproducing the slide through the lenses onto a self-developing film in the camera.

Another aspect of the invention resides in an apparatus for carrying out the invention. Briefly stated, this apparatus may comprise a self-developing camera having a picture-taking lens at infinity setting and a self-developing film sheet; and a slid-copying attachment connectable to said camera and including means for holding a slide to be reproduced, and a reproducing lens spaced from the slide by a distance corresponding to the focal length of the reproducing lens and located parallel and proximal to the picture-taking lens when the attachment is connected to the camera for reproducing a picture of the slide on the film sheet in the camera.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWINGS

The single FIGURE is a diagrammatic vertical section illustrating an embodiment of the invention.

DESCRIPTION OF PREFERRED EMBODIMENTS

The FIGURE illustrates a currently preferred embodiment of an apparatus according to the invention, and the inventive method will also be described with reference to the FIGURE and in conjunction with the apparatus embodiment.

A per se known instant picture (self-developing) camera 4 (of e.g. the type disclosed in allowed U.S. application Ser. No. 791,984, now U.S. Pat. No. 4,171,886, issued Oct. 23, 1979, which is fully incorporated by reference herein) has a picture-taking lens 5, a shutter 8, and a window 7 for the admission of scene light to the electronic control unit (not shown) which controls operation of the shutter 8. These are all features which are known per se in the self-developing camera art.

The camera also has the usual cassette 6 containing (not illustrated) a stack of self-developing film sheets, a pair of cooperating rollers 9, 10 between which the exposed film sheets must pass so that the rollers spread developer fluid over the picture area, and an outlet slot 11 through which the exposed film sheets leave the camera 4.

In the simplest self-developing cameras the lens 5 is permanently set for infinity, so that its focal length with respect to the film to be exposed is $f_1$ as shown. In more complicated ones of these cameras the lens 5 is adjustable to vary the focal length and permit taking pictures of objects located closer than in the infinity range; however, all such cameras also have an infinity setting which is clearly marked and to which the lens can be set.

According to the invention an adapter 1 is provided (e.g. a tubular or otherwise shaped sleeve) which is essentially composed of a holder 1a for a slide 2 and a lens 3 which is spaced rearwardly from the slide 2 by the focal length $f_2$. The lens 3 need not be elaborate; it may have a relatively low light-gathering power and, consequently, a small diameter. For example, a two-lens or similar simple construction will be adequate.

The adapter 1 is also provided with a window 1c which, when the adapter is installed on the camera 4, is located opposite the inlet window 7 of the shutter-controlling light-sensitive electronic unit of the camera. Light passing through the slide 2 can therefore travel through the windows 1c, 7 to the electronic unit, to be measured thereby. There will be a small parallax error between the light passing through the lenses 3, 5 and the light passing through the windows 1c, 7; this is compensated by the fact that the wiindow 1c is prism-shaped. It is advisable, but not absolutely necessary, to arrange a diffusor 1b in front of the slide 2, i.e. as considered with reference to the incoming light.

The two lenses 5 and 3 are each shaped from their respectively associated focal planes (i.e. the planes of elements 6 and 2, respectively) by a distance corresponding to the focal length of the respective lens. Because of this the light paths between the two lenses are parallel and the arrangement is optically not affected by small relative displacements (or tolerance variations) affecting the spacing between the lenses 3 and 5. Furthermore, the aperture of lens 3 is relatively small, so that the depth of field for reproduction of the slide 2 is correspondingly large.

To use the disclosed apparatus, and to practice the disclosed method, the attachment 1 is secured to the camera 4; any known-per-se coupling or connecting arrangement may be employed for this purpose, so long as it assures that the lens 3 will be located as close as possible to the lens 5 and that the window 1c will be located opposite window 7. The lens 5, if not permanently fixed on infinity, is set to infinity and the slide 2 is placed into the holder 1a.

Now, the shutter release of the camera 4 is operated, so that the slide 2 is reproduced on a film sheet (not shown) of the cassette 6, whereafter the film sheet is developed in the usual manner, providing a positive paper picture of the slide.

Since the arrangement, once the adapter 1 is mounted on the camera 4, is rigid—i.e. since no relative movements of camera and adapter can occur—blurring of the picture is impossible even if long exposure times should be required due to the low power of lens 3 and/or weak light impinging on diffuser 1b or slide 2. Correction of the expose time can be made in the usual manner with the controls of the camera 4 itself.

It will generally be desired to reproduce as large a picture of the slide 2 as possible; i.e. to have the picture fill the entire format of the film sheet. For this purpose it is advisable to so select the focal length $f_2$ of the lens 3 that it is smaller than the focal length $f_1$ of lens 5 by the ratio of the two diagonals of the film-sheet format. This fully uses the format of the film sheet but does not reproduce the slide itself in its entirely. If it is desired to copy the entire slide content on the film sheet, then it will usually be necessary to accept non-exposed border areas on the film-sheet picture, i.e. border areas surrounding the reproduction of the slide. For example, the picture format of a known self-developing film for use in the camera 4 is 69×92 mm. A conventional 36 mm slide has a usable format of about 23×35 mm. The ratio of the two larger dimensions (of the two formats) is therefore about 2.63:1. If, now, the focal length of the lens 5 is e.g. 110 mm, then the focal length of the lens 3 must be about 42 mm to assure that the larger (35 mm) edge of the slide 2 will be exactly reproduced on the larger (92 mm) edge of the picture area of the self-developing film. However, the shorter (23 mm) edge of the slide 2 will cover only about 62 mm of the 69 mm length of the shorter edge of the picture area, so that a non-exposed strip of about 3—4 mm will remain at the longitudinal edges of the picture area.

It will be appreciated that the invention is not limited to the example described herein. It is, instead, susceptible of various modifications. For example, the adapter 1 may be provided with a light source (e.g. an incandescent light or a flash-producing device) for illuminating the slide 2. Should a flash device be used, then a suitable connection must be provided from it to the flash-triggering contact of the camera 4 and the illumination provided by the device must be such that correct exposure is obtained for normal-density slides.

While the invention has been illustrated and described as embodied in a slide-copying apparatus, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. An apparatus for making positive pictures from slides, in which a camera has a picture-taking lens at infinity setting and in which a slide-copying attachment is connectable to said camera and including means for holding a slide to be reproduced, and a reproducing lens spaced from the slide by a distance and located parallel and proximal to said picture-taking lens when said attachment is connected to said camera for reproducing a picture of said slide in said camera, wherein the improvement comprises: a self-developing camera having a self-developing film sheet and being connectable to said slide-copying attachment; a light sensing control next to said picture-taking lens which control receives light through a window arranged in said attachment and actuates a shutter for controlling the exposure of the slide; and a prism associated to the window for deflecting light passing through the slide into an inlet of said light-sensing control, the slide and the picture area of the film sheet each being rectangular and having a shorter edge dimension and a longer edge dimension, the ratio of the focal length of said reproducing lens to the focal length of the said picture-taking lens being equal to the ratio to the longer edge dimension of the slide to the longer edge dimension of the instant-film picture area, the distance between said reproducing lens and said slide corresponding to the focal length of said reproducing lens.

* * * * *